United States Patent [19]

Sato et al.

[11] Patent Number: 5,083,811
[45] Date of Patent: Jan. 28, 1992

[54] FLUID SUPPLY CIRCUIT FOR ACTIVE SUSPENSION SYSTEM WITH VARIABLE FLUID SOURCE DISCHARGE RATE DEPENDING UPON MAGNITUDE OF LATERAL ACCELERATION

[75] Inventors: Masaharu Sato; Naoto Fukushima; Yukio Fukunaga; Yohsuke Akatsu; Itaru Fujimura; Kensuke Fukuyama, all of Kanagawa, Japan

[73] Assignee: Nissan Motor Company, Limited, Japan

[21] Appl. No.: 614,950

[22] Filed: Nov. 14, 1990

Related U.S. Application Data

[63] Continuation-in-part of Ser. No. 515,520, Apr. 30, 1990, abandoned.

[30] Foreign Application Priority Data

Apr. 28, 1989 [JP] Japan .................................. 1-110625

[51] Int. Cl.$^5$ ............................................. B60G 11/26
[52] U.S. Cl. ...................................... 280/707; 280/714
[58] Field of Search ................................. 280/707, 714

[56] References Cited

U.S. PATENT DOCUMENTS

| | | | |
|---|---|---|---|
| 4,624,476 | 11/1986 | Tanaka et al. | 280/707 |
| 4,695,074 | 9/1987 | Kobayashi et al. | 280/707 |
| 4,702,490 | 10/1987 | Yamaguchi et al. | 280/707 |
| 4,763,745 | 8/1988 | Eto et al. | 280/707 |
| 4,801,115 | 1/1989 | Heard | 248/219.3 |
| 4,848,790 | 7/1989 | Fukunaga et al. | 280/708 |
| 4,865,348 | 9/1989 | Hano et al. | 280/707 |
| 4,903,983 | 2/1990 | Fukushima et al. | 280/707 |

FOREIGN PATENT DOCUMENTS

| | | |
|---|---|---|
| 0249209 | 6/1987 | European Pat. Off. . |
| 0249227 | 6/1987 | European Pat. Off. . |
| 0283004 | 3/1988 | European Pat. Off. . |
| 0284053 | 3/1988 | European Pat. Off. . |
| 0285153 | 3/1988 | European Pat. Off. . |
| 0286072 | 4/1988 | European Pat. Off. . |
| 0314164 | 10/1988 | European Pat. Off. . |
| 0318721 | 11/1988 | European Pat. Off. . |
| 0318932 | 11/1988 | European Pat. Off. . |
| 0345816 | 6/1989 | European Pat. Off. . |
| 0345817 | 6/1989 | European Pat. Off. . |
| 3902312 | 1/1989 | Fed. Rep. of Germany . |
| 3904922 | 2/1989 | Fed. Rep. of Germany . |
| 3910030 | 3/1989 | Fed. Rep. of Germany . |
| 3910445 | 3/1989 | Fed. Rep. of Germany . |
| 61-249509 | 6/1986 | Japan . |

Primary Examiner—Kenneth R. Rice
Attorney, Agent, or Firm—Lowe, Price, LeBlanc & Becker

[57] ABSTRACT

A fluid supply system is provided for an active vehicle suspension system, for supplying fluid pressure for a hollow working cylinder via a pressure control valve for adjusting suspension characteristics of the vehicle in order to suppress vehicular attitude changes and to absorb road shock vibration, the system having a pressurized fluid source unit for circulating a pressurized fluid through a fluid circuit extending via the pressure control valve and the working cylinder. A first sensor is provided for monitoring a relative displacement between the body of the vehicle and a suspension member rotatably supporting a road wheel thereof, for producing a relative displacement magnitude indicative signal. A second sensor is provided for monitoring a lateral acceleration exerted on the vehicle body. A predicted fluid flow amount through said fluid circuit is derived on the basis of the relative displacement indicative signal to produce a predicted fluid flow amount indicative signal. A magnitude of lateral acceleration greater than or equal to a predetermined acceleration criterion is detected to produce an acceleration detection signal. The fluid supply amount from the pressurized fluid source unit is derived of the basis of the predicted fluid flow amount for controlling the pressurized fluid source unit in order to adjust the supply amount of fluid toward the derived fluid supply amount in response to the acceleration detection signal for increasing the supply amount.

12 Claims, 13 Drawing Sheets

5,083,811

FLUID SUPPLY CIRCUIT FOR ACTIVE SUSPENSION SYSTEM WITH VARIABLE FLUID SOURCE DISCHARGE RATE DEPENDING UPON MAGNITUDE OF LATERAL ACCELERATION

This application is a continuation-in-part of U.S. application Ser. No. 07/515,520, filed Apr. 30, 1990, now abandoned.

BACKGROUND OF THE INVENTION

1. Field of the Invention

The present invention relates generally to an active suspension system for an automotive vehicle. More particularly, the invention relates to a pressure medium fluid circuit to be adapted for the active suspension system, which achieves optimal fluid discharge performance.

2. Description of the Background Art

U.S. Pat. No. 4,702,490, issued on Oct. 27, 1987 which has been assigned to the common owner to the present invention, discloses a typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as a proportioning valve assembly, is disposed in the hydraulic circuit, which is connected to an electric or electronic control circuit to be controlled the valve position. The pressure control valve position is controlled by a suspension control signal produced in the control circuit for adjusting pressure in the working chamber and thereby, the suspension characteristics.

On the other hand, European Patents 0 283 004, 0 285 153 and 0 284 053 discloses technologies for controlling the suspension systems constructed as set forth above, depending upon the vehicle driving condition for suppressing rolling and/or pitching of the vehicular body.

In one of the know systems the hydraulic circuit includes a pressure source unit which comprises a fluid pump drivingly associated with an automotive internal combustion engine so as to be driven by the engine output torque. The fluid pump is generally rated to produce a rated pressure which is selected in view of the required line pressure in a supply line for supplying the pressurized fluid to the working chamber at the minimum revolution speed of the engine, so that the working fluid pressure to be supplied to the working chamber of the hydraulic cylinder can be satisfactorily high at any engine driving range. As will be appreciated, the output pressure of the fluid pump increases with the engine revolution speed. Therefore, at high engine revolution speeds, excessive pressure in excess of a predetermined maximum line pressure is relieved via a relief valve. Therefore, the engine output can be wasted and this may degrade engine driving performance as a power plant for the automotive vehicle and thus degrade fuel economy.

On the other hand, in the practical operation of the active suspension system, the fluid pressure in the working chamber in the hydraulic cylinder can be maintained at a constant value for maintaining a desired vehicular height, at substantially low vehicle speed range or while the vehicle is not running. Despite this fact, the prior proposed hydraulic circuits for the actively controlled suspension systems supply the rated pressure of the fluid pump which should be higher than a minimum line pressure required for adjustment of the fluid pressure in the working chamber. In order to maintain the rated pressure to be output from the fluid pump, substantial engine output will be consumed even at low vehicle speeds, in which the line pressure is not required for no possibility of adjustment of the suspension characteristics.

Improvement in the hydraulic circuit for the prior proposed active suspension system has been proposed in the co-pending U.S. patent application Ser. No. 331,602, filed on Mar. 31, 1989, which application has been commonly assigned to the common assignee to the present invention. The corresponding invention to the above-identified co-pening U.S. patent application has been published as Japanese Patent First (unexamined) Publication (Tokkai) Heisei 1-249509, published on Oct. 4, 1989. The prior invention has been directed to a hydraulic circuit for an actively controlled suspension system which employs first and second pressure relief valves disposed in a hydraulic pressure source circuit for relieving excessive pressure. The second pressure relief valve is provided a lower relief pressure than that of the first pressure relief valve. Means for selectively connecting and disconnecting the second pressure relief valve is disposed in the hydraulic pressure source circuit at an orientation upstream of the second pressure relief valve. The means is positioned at shut-off position to disconnect the second pressure relief valve when a vehicle traveling speed is higher than a predetermined speed. The means is responsive to the vehicle speed lower than the predetermined speed for establishing connection between a pressurized fluid source to the second relief valve for relieving the pressure at lower level than that established when the vehicle speed is higher than the predetermined speed.

Furthermore, the prior proposed invention includes a pilot pressure operated operational one-way check valve in a drain line for regulating line pressure to be supplied to a pressure control valve which adjusts fluid pressure in a working chamber in a hydraulic cylinder disposed between a vehicle body and a suspension member rotatably supporting a road wheel, by draining excessive line pressure. Similar hydraulic circuit constructions have also been disclosed in European Patent First Publications Nos. 0 318 721, 0 318 932, for example.

In the prior proposed active suspension systems, the fluid pressure is supplied from a fluid pump which is driven by an automotive internal combustion engine. As can be appreciated, this type of the fluid pump has a variable discharge rate depending upon the engine revolution speed. In order to prevent pulsation in the line pressure, a pressure regulating means is provided in the pressure supply network. On the other hand, when variations of stroke occur in relative bounding and rebounding motion of the vehicle body and the suspension member, an increased discharge rate of the fluid pump is required so as to compensate relatively large amount of working fluid supplied and drained into and from a working cylinder. Japanese Patent First (unexamined) Publication (Tokkai) Showa 63-251313 discloses a pressure supply system having a capability for adjustment of the discharge rate of the fluid pump depending upon relatively large magnitude of bounding and/or rebounding acceleration.

The proposed system is particularly advantageous when the vehicle is in the parking, resting or not running state because of a smaller discharge rate of the fluid pump and smaller power loss in the engine. On the other hand, the proposed system is so designed as to command increasing of the discharge rate in response to large magnitude of bounding and rebounding acceleration. However, the signal representative of bounding and rebounding magnitude does not necessarily correspond to the fluid flow rate to be consumed in the active suspension system. Therefore, the discharge rate of the fluid pump as controlled by the command generated in response to large magnitude of bounding and rebounding acceleration cannot precisely correspond to that required in the active suspension system. Therefore, the line pressure tends to become excessively high to lead wasting of the engine output power and excessively low to lead in sufficient suspension adjusting performance.

On the other hand, Japanese Patent First (unexamined) Publication No. 63-251313 discloses a hydraulic circuit for an active suspension system, which is sensitive to lateral acceleration exerted on the vehicular body for increasing discharge rate of a fluid pump forming the pressurized fluid source unit of the hydraulic system for compensating working fluid amount to be consumed for anti-rolling and/or anti-pitching operation. However, in certain vehicle driving conditions, the magnitude of lateral acceleration may not directly correspond to the working fluid amount for suspension control. In such a case, increasing of discharge rate in the fluid pump simply results in power loss of a driving power source such as an automotive internal combustion engine.

SUMMARY OF THE INVENTION

Therefore, it is an object of the present invention to provide an enhanced fluid pressure supply system for an active suspension system for an automotive vehicle.

In a preferred embodiment of the invention, a fluid supply system for an active vehicle suspension system is provided for supplying fluid pressure for a hollow working cylinder via a pressure control valve for adjusting suspension characteristics in order to suppress vehicular attitude change and absorb road shock vibration, and the system comprises:

a pressurized fluid source unit for circulating a pressurized fluid through a fluid circuit extending via said pressure control valve and said working cylinder;

a first sensor means for monitoring a relative displacement between a vehicular body and a suspension member rotatably supporting a road wheel for producing a signal indicative of the relative displacement magnitude;

a second sensor means for monitoring a lateral acceleration exerted on the vehicular body;

first means for deriving a predicted fluid flow amount through said fluid circuit on the basis of said relative displacement indicative signal to produce a predicted fluid flow amount indicative signal;

second means for detecting a magnitude of lateral acceleration greater than or equal to a predetermined acceleration criterion to produce an acceleration detection signal; and third means for deriving fluid supply amount from said pressurized fluid source unit on the basis of said predicted fluid flow amount for controlling said pressurized fluid source unit in order to adjust the supply amount of fluid toward the derived fluid supply amount, said third means being responsive to said acceleration detection signal for increasing the supply amount.

In another aspect of the invention, the third means may maintain the increased supply amount for a given period of time after termination of said acceleration indicative signal.

BRIEF DESCRIPTION OF THE DRAWINGS

The present invention will be understood from the detailed description given hereinbelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
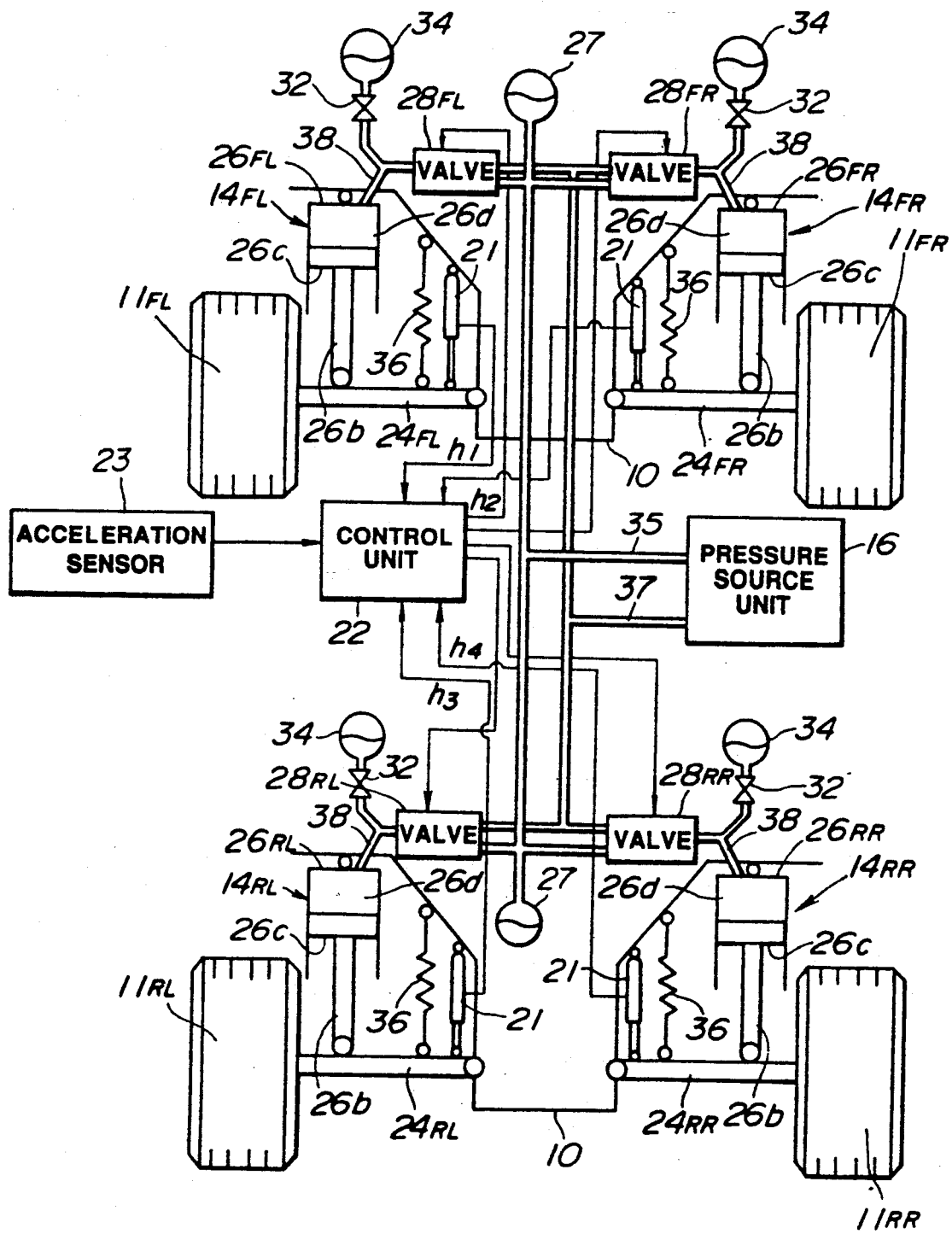
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereinafter represented by the reference number "24" as generally referred to. Similarly, the suspension mechanism as generally referred to will be hereafter represented by the reference number "14" Respective front-left, front-right, rear-left and rear-right suspension mechanisms 14FL, 14FR, 14RL and 14RR have hydraulic cylinders 26FL, 26FR, 26RL and 26RR which will be represented by the reference numberal "26" as generally referred to.

Each of the hydraulic cylinders 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in a substantially restricted amount. The piston 26c is connected to the associated one of suspension member 24 via a piston rod 26d. A suspension coil spring 36 employed in the shown type of the suspension system is not required to provide a resilient force in a magnitude required in the ordinary suspension system and is required to provide only the resilient force necessary for maintaining the vehicular body about the suspension member.

The working chamber 26d of the hydraulic cylinder 26 is connected to one of pressure control valves 28FL, 28FR, 28RL and 28RR via a pressure control line 38. The pressure control valve 28FL, 28FR, 28RL and 28RR will be hereinafter, represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as proportioning solenoids. The actuators are connected to a microprocessor-based control unit 22.

Figure 3:
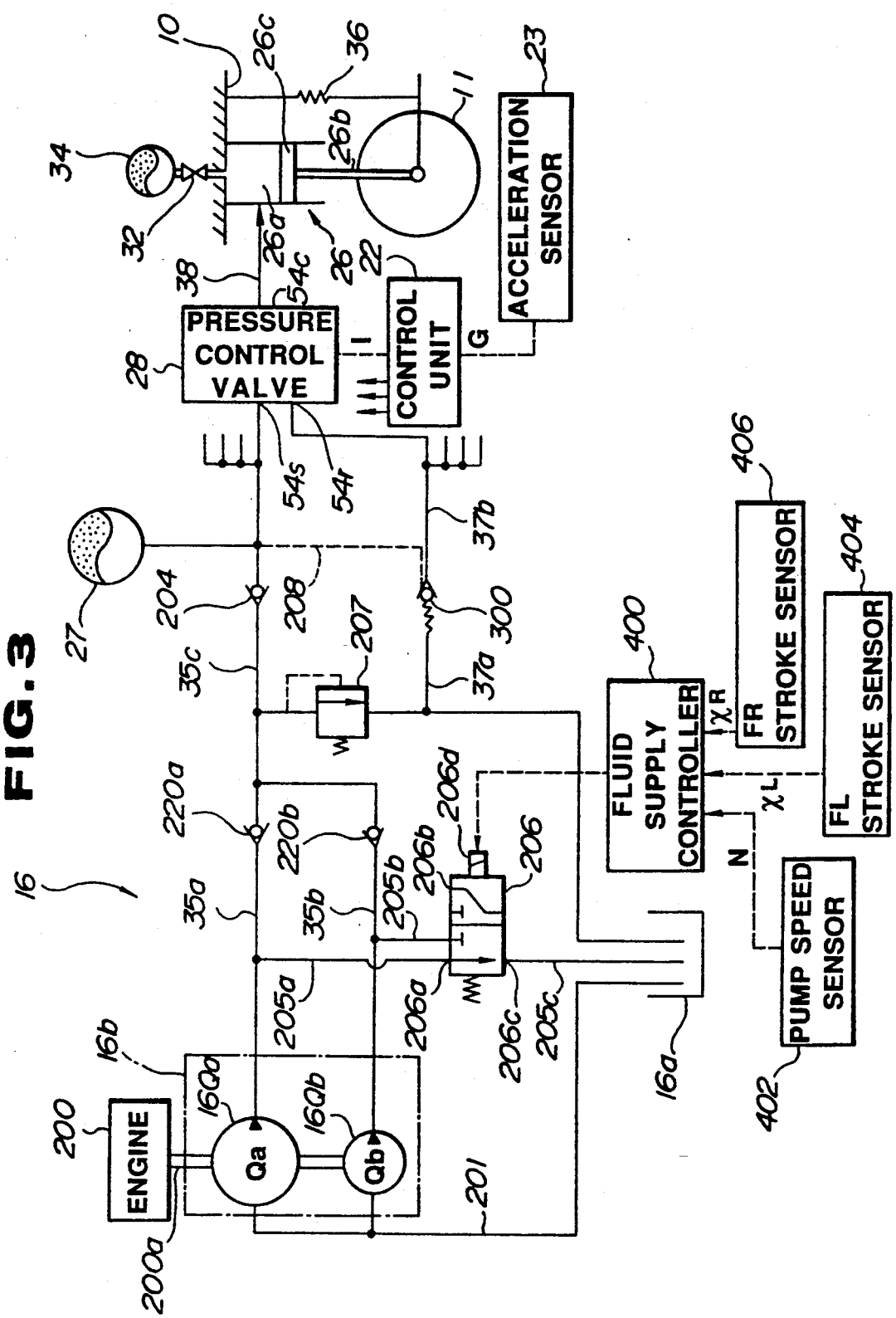
FIG. 3 is a circuit diagram of the first embodiment of a hydraulic circuit which is applicable for the active suspension system according to the present invention.

The control unit 22 is connected a plurality of vehicular height sensors 21 which are disposed in respectively associated suspension mechanism and designed for monitoring relative positions of the vehicular body 10 and the relevant suspension member 24 to produce a vehicular height level indicative signals $h_1$, $h_2$, $h_3$ and $h_4$. The control unit 22 is also connected to a lateral acceleration sensor, a longitudinal acceleration sensor and the like to receive the vehicle driving condition indicative parameters. In FIG. 3, the lateral and longitudinal acceleration sensors will be generally referred to as "acceleration sensor" and generally represented by reference numeral 23. In the shown embodiment, the acceleration sensor referred to comprises a lateral acceleration sensor for monitoring lateral acceleration exerted on the vehicular body and producing a corresponding lateral acceleration indicative signal. Based on these control parameters, including the height level indicative signals, a lateral acceleration indicative signal $G_Y$ generated by the lateral acceleration sensor, a longitudinal acceleration indicative signal $G_X$ generated by the longitudinal acceleration sensor, and so forth, the control unit performs anti-rolling, anti-pitching and bouncing suppressive suspension controls.

Practical implementation of the suspension control have been disclosed in the various prior proposed applications. For example, publications and issued patents, all of which are commonly owned or assigned to the owner or assignee of the present invention, and for which a pressure control valve unit according to the present invention is applicable, are listed hereinbelow.

U.S. patent application Ser. No. 052,934, filed on May 22, 1989, which has now been issued as U.S. Pat. No. 4,903,983, on Feb. 27, 1990, the same being incorporated in by reference;

U.S. patent application Ser. No. 059,888, filed on June 9, 1987, corresponding European Patent Application has been published as First Publication No. 02 49 209;

U.S. patent application Ser. No. 060,856, filed on June 12, 1987, corresponding European Patent Application has been published as First Publication No. 02 49 227;

U.S. patent application Ser. No. 060,909, filed on June 12, 1987;

U.S. patent application Ser. No. 060,911, filed on June 12, 1987, which has now been issued as U.S. Pat. No. 4,801,115, on Jan. 31, 1989;

U.S. patent application Ser. No. 176,246, filed on Mar. 31 1988, the corresponding European Patent Application has been published as First Publication No. 02 85 153;

U.S. patent application Ser. No. 178,066, filed on Apr. 5, 1986, which has now been issued as U.S. Pat. No. 4,848,790, on July 18, 1989, and the corresponding European Patent Application has been published as First Publication No. 02 86 072;

U.S. patent application Ser. No. 167,835, filed on Mar. 4, 1988, which has now been issued as U.S. Pat. No. 4,865,348, on Sept. 12, 1989;

U.S. patent application Ser. No. 244,008, filed on Sept. 14, 1988;

U.S. patent application Ser. No. 255,560, filed on Oct. 11, 1988;

U.S. patent application Ser. No. 266,763, filed on Nov. 3, 1988, corresponding European Patent Application has been published under First Publication No. 03 18 721;

U.S. patent application Ser. No. 261,870, filed on Oct. 25, 1988; U.S. patent application Ser. No. 263,764, filed on Oct. 28, 1988, corresponding European Patent Application has been published under First Publication No. 03 14 164;

U.S. patent application Ser. No. 277,376, filed on Nov. 29, 1988, corresponding European Patent Application has been published under First Publication No. 03 18 932;

U.S. patent application Ser. No. 303,338, filed on Jan. 26, 1989, corresponding German Patent Application has been published under First Publication No. 39 02 312;

U.S. patent application Ser. No. 302,252, filed on Jan. 27, 1989;

U.S. patent application Ser. No. 310,130, filed on Mar. 22, 1989, corresponding German Patent Application has been published under First Publication No. 39 04 922;

U.S. patent application Ser. No. 327,460, filed on Mar. 22, 1989, corresponding German Patent Application has been published under First Publication No. 39 10 030;

U.S. patent application Ser. No. 303,339, filed on Jan. 26, 1989;

U.S. patent application Ser. No. 331,602, filed on Mar. 31, 1989;

U.S. patent application Ser. No. 331,653, filed Mar. 31, 1989, corresponding German Patent Application has been published under First Publication No. 39 10 445;

U.S. patent application Ser. No. 364,477, filed on June 12, 1989, corresponding European Patent Application has been published under First Publication No. 03 45 816;

U.S. patent application Ser. No. 365,468, filed on June 12, 1989, corresponding European Patent Application has been published under First Publication No. 03 45 817;

U.S. patent application Ser. No. 422,813 filed on Oct. 18, 1989;

U.S. patent application Ser. No. 454,785, filed on Dec. 26, 1989;

The disclosures of the hereabove listed prior applications, publications and patents are herein incorporated by reference. Furthermore, any two or more prior proposed inventions may be combined in practical implementation of an active suspension system. Therefore, any combination of the above mentioned prior proposed inventions are to be deemed as disclosed due to incorporation by reference as a part of the present invention.

While the specific sensors, such as the vehicle height sensors which comprise strike sensor, the lateral acceleration sensor 23 and the longitudinal acceleration sensor 25, it is possible to replace or add any other sensors which monitor vehicle driving parameters associated with the suspension control. For instance, the stroke sensors employed in the shown embodiment can be replaced with one or more vertical acceleration sensors. Similarly, the lateral accelaration sensor may be replaced with a steering angle sensor for monitoring steering behavior for assuming lateral force to be exerted on the vehicular body. In the later case, the parameter indicative of the steering angular displacement may be used in combination of a vehicular speed data since vehicular speed may influence for rolling magnitude of the vehicle during steering operation.

Figure 2:
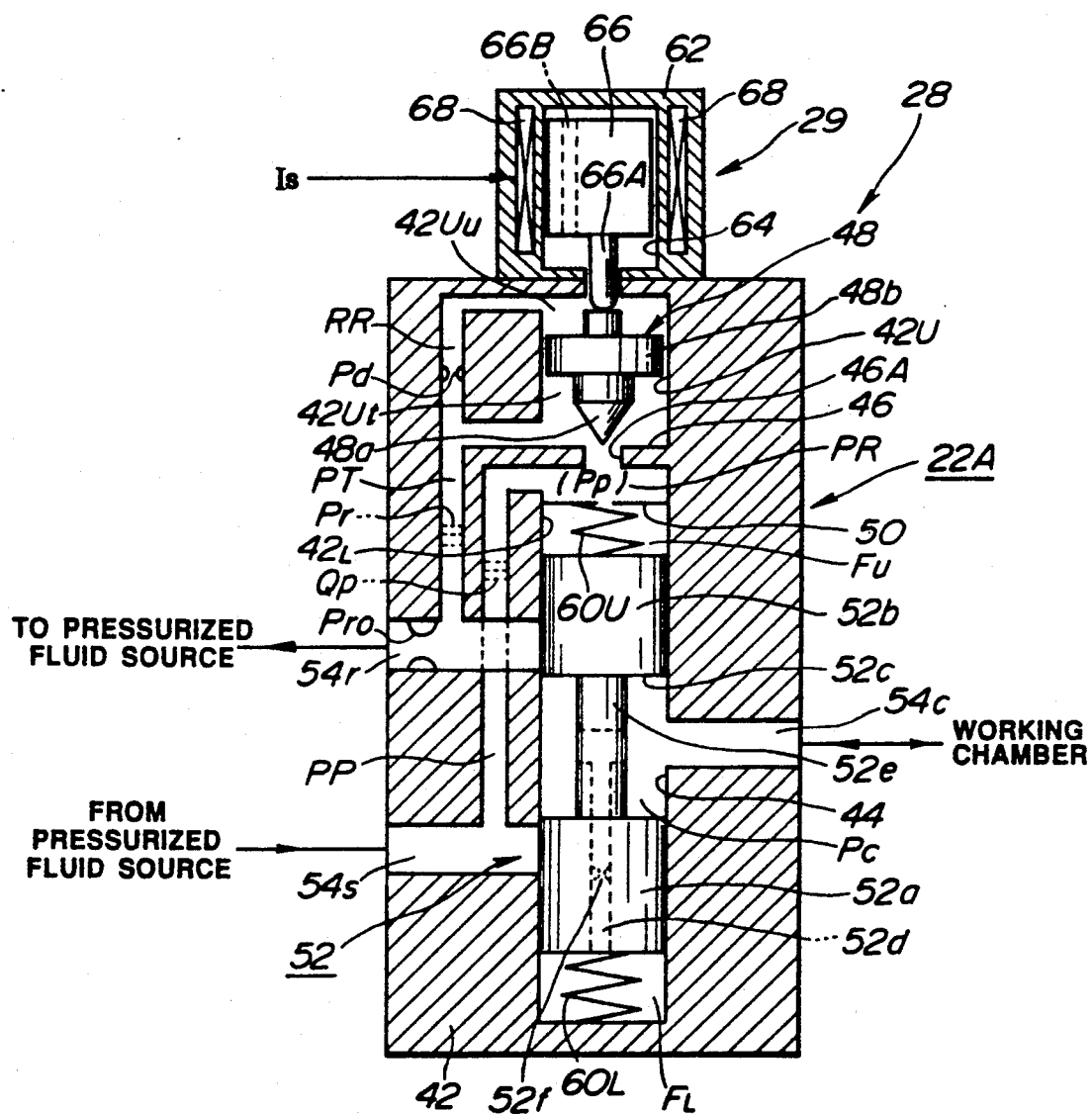
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls the magnitude of pressurized fluid introduced into and drained from the working chamber 26d for adjusting the pressure in the working chamber. As will be appreciated, the adjusted fluid pressure in the working fluid determines damping force to be created in response to relative displacement between the vehicle body 10 and the suspension member 24. The mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valvee spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the botto of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neeutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26, is held constant.

The valve spool 52 is formed withe lands 52a and 52b connected to each other via smaller diameter bar-like section 52e. The land 52a is oriented adjacent the lower feedback chamber FL so as to subject the tip end end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining a internal space to receive therein a plunger 66. The plunger 66 has a plunger rod 66A. The tip end of the plunger rod 66A is kept in contact with the tip end of the poppet valve member 48 remote from te valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housing within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are ccommnicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifices oriented at the most upstream side is mainly effective for restricting fluid flow when fluid flowing therethrough is in steady flow and that all of the orifices of respecctive strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create significant flow restriction against pulsatile fluid flow cyclically varying the fluid pressure at a frequency of approximately 1 Hz.

As can be seen from FIG. 2, the pressure control valve 28 is so arranged as to direct the axis of the valve bore 44 parallel to the longtudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 6:
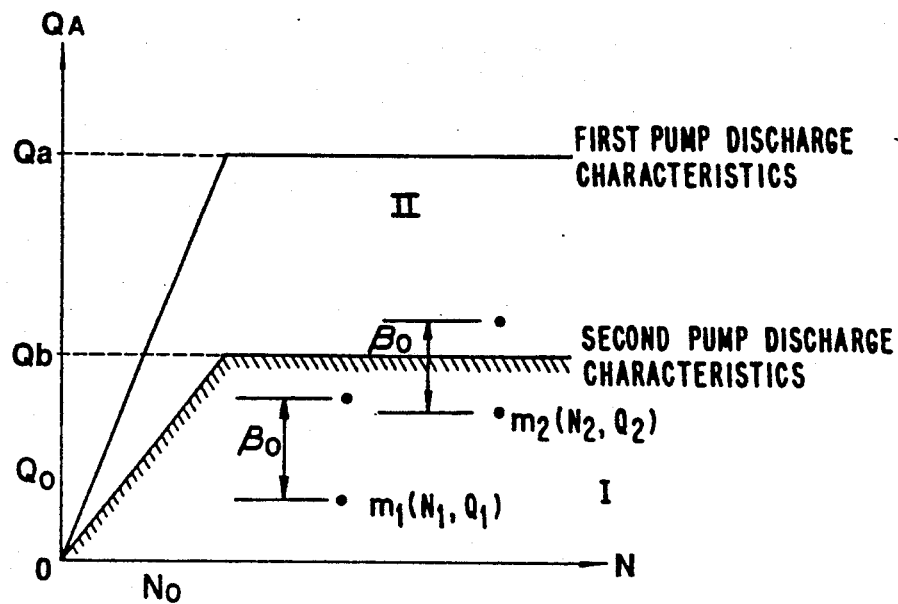
FIG. 6 is a chart showing discharge characteristics versus pump speed in a pressure unit employed in the first embodiment of the hydraulic circuit of FIG. 3.

FIG. 3 shows detailed circuit construction of one example of hydraulic circuit which is applicable of the shown embodiment of the active suspension system, according to the present invention. The hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201, the fluid pump unit 16 b is associated with an automotive engine 200 so as to be driven by the output torque of the latter output from an engine output shaft 200a. In the shown embodiment, the fluid pump unit 16 b comprises a plunger pump having a plurality of cylinders. Among the plurality of cylinders, a first group of cylinders is constituted of every other cylinder and forms a first pump $16_{Qa}$, and a second group of cylinders is constituted of another set every other cylinder and forms a second pump $16_{Qb}$. The discharge rate of the first pump $16_{Qa}$ is set to be greater than that of the second pump $16_{Qb}$. The discharge characteristics versus the engine speed dependent pump speed of respective of the first and second pumps $16_{Qa}$ and $16_{Qb}$ are illustrated in FIG. 6.

The outlet of the first pump $16_{Qa}$ is connected to the supply port 54s of the pressure control valve 28 via a branched supply line 35a and a common supply line 35c. Similarly, the outlet of the second pump $16_{Qb}$ is connected to the supply port 54s of the pressure control valve 28 via a branched supply line 35b and the common supply line 35c. One-way check valves 220a and 220b are disposed in respective ones of the branched supply lines 35a and 35b. On the other hand, a pressure accumulator 222 for absorbing pulsatile are variation is disposed in the common supply line 35c. An one-way check valve 204 is disposed in the common supply line 35c at the position upstream of the junction between the pressure accumulators 222 and the supply line 35.

A first flow control line 205a is also connected to the branched supply line 35a at one end. The other end of the first flow control line 205a is communicated with the fluid reservoir 16a. An electromagnetic flow control valve 206 is disposed in the first flow control line 205a. The electromagnetic flow control valve 206 has a first inlet port 206a connected to the branched supply line 35a via the first flow control line 205a. Similarly, a second pressure relief line 205b is connected to the branched supply line 35b at one end. The other end of the second flow control line 205b is communicated with the fluid reservoir 16a. The electromagnetic flow control valve 206 is also disposed in the second flow control line 205b. The electromagnetic flow control valve 206 has a second inlet port 206b connected to the branched supply line 35b via the second pressure relief line 205b. The electromagnetic flow control valve 206 also has an output port 206c communicated with the fluid reservoir 16a via a return line 205c.

The electromagnetic flow control valve 206 includes an electromagnetically operable solenoid 206d for switching valve position of the flow control valve in response to a flow control signal CS suplied from fluid supply controller 400 which will be discussed in detail later. In the shown embodiment, the flow control signal CS is varible between HIGH level and LOW level for commanding variation of the position of the electromagnetic flow control valve 206. The solenoid 206d is responsive to the LOW level flow control signal CS to place the electromagnetic flow valve 206 at a position where fluid communication between the first inlet port 206a and the outlet port 206c is established and the fluid communication between the second inlet port 206b and the outlet port 206c is blocked At this valve position, a large proportion of or major part of the pressurized fluid discharged from the first pump $16_{Qa}$ is directly drained to the fluid reservoir 16a via the first flow control line 205a, the electromagnetic flow control valve 206 and the return line 205c.

On the other hand, the solenoid 206d is responsive to the HIGH level flow control signal CS to place the electromagnetic flow valve 206 at a position where fluid communication between the second inlet port 206b and the outlet port 206c is established and the fluid communication between the first inlet port 206a and the outlet port 206c is blocked. At this valve position, a large proportion of or major part of the pressurized fluid discharged from the secondd pump $16_{Qb}$ is directly drained to the fluid reservoir 16a via the second flow control line 205b, the electromagnetic flow control valve 206 and the return line 205c. As can be appreciated, since the first pump $16_{Qa}$ has a greater discharge rate than that of the second pump $16_{Qb}$, greater fluid flow rate is established when the valve is in the latter mentioned position.

In the following disclosure, the operational mode of the electromagnetic flow control valve 206 at the former valve position, in which the first inlet port and the outlet port are communication, will be hereafter referred to as "smaller flow rate mode" and at the latter valve position, in which the second inlet port and the outlet port are communicated, will be hereafter referred to as "greater flow rate mode".

In parallel to the electromagnetic valve 206, a pressure regulator valve 207 is provided for regulating line pressure in the supply line 35. The pressure regulator valve 207 is connected to the supply line 35 at an orientation downstream of the junction of the first and second branched supply lines 32a and 35b and upstream of the one-way check valve 204. The pressure regulator valve 207 is designed so as to regulate the line pressure in the supply line at a predetermined set pressure.

On the other hand, an operational one-way check valve 300 is disposed between the sections 37a and 37b of the drain line 37. The operational one-way check valve 300 is also connected to the supply line 35 downstream of the one-way check valve 204 to receive therefrom the pressure in the supply line as a pilot pressure, via a pilot line 208. The operational one-way check valve 300 is designed to be maintained at an open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into a shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

Figure 5:
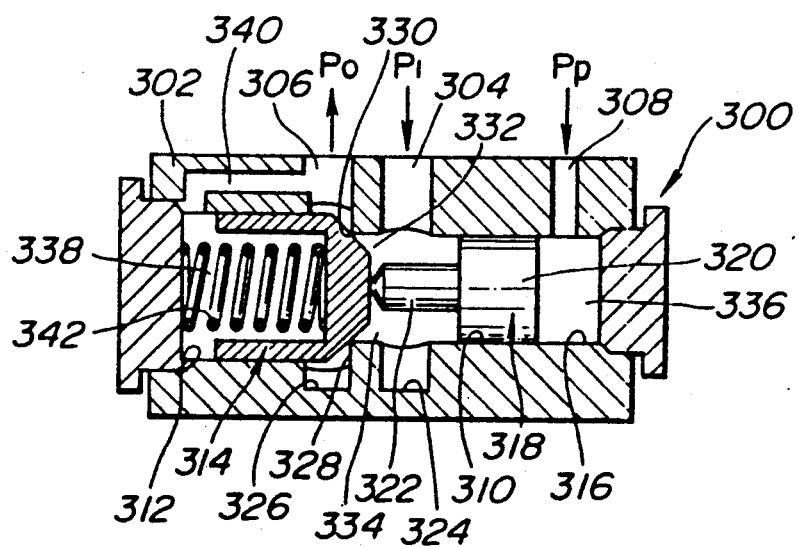
FIG. 5 is a section of an operational one-way check valve employed in the hydraulic circuit of FIG. 3.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section 35a disposed between the one-way check valve 204 and the pressure control valve unit 28FL 28FR, 28RL and 28RR, via the pilot line 300a. The pilot port 308, on the other hand, is communicated with the smaller diameter section 316 to supply the line pressure of the supply line 35 at the orientation downstream of the one-way check valve 204 as the pilot pressure $P_p$. The inlet port 304 is communicated with the drain port 54r of the pressure control valve unit 28 via a section 37b of the drain line 37. The inlet port 304 communicates with the smaller diameter section 316 via an annular groove 324 formed on the inner periphery of the valve housing 302. The outlet port 306 is communicated with the fluid reservoir 16a via a section 37a of the drain line 37 and, in turn, communicated with the larger diameter section 312 via an annular groove 326 formed on the inner periphery of the valve housing 302. As seen from FIG. 5, the annular grooves 324 and 326 are oriented in side-by-side relationship with leaving a radially and inwardly projecting land 328. The land 328 has a shoulder 330.

The valve spool 318 and the poppet valve 314 are cooperated with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both of the pressure relief valve for relieving the excessive pressure in the drain line and one-way check valve. The relief pressure of the poppet valve 314 can be illustrated by the following balancing equation:

$$F_O = P_{pO} \times A$$

where
$F_O$ is the set pressure of the set spring 342;
A is an efffective area of the spool; and
$P_{pO}$ is a relief pressure.

Here, assuming that the pressure Pi at the inlet port 304 is greater than or equal to the pilot pressure $P_p$ at the pilot chamber 336, the valve spool 318 is shifted away from the poppet valve 314 so that the pilot pressure $P_p$ in the pilot chamber 336 is not active on the valve position of the poppet valve. In such a case, the poppet valve 314 operates purely as the pressure relief valve for relieving excessive pressure. At this time, the force balance as illustrated by:

$$Pi \times A = P_{pO} \times A$$

can be established. Therefore, as long as the fluid pressure Pi at the inlet port 304 is higher than the relief pressure $P_{pO}$, the shoulder 332 of the poppet valve 314 is held away from the shoulder 330 of the land 328 so as to permit fluid flow through the outlet port 306 and the section 37a of the drain line 37 to the fluid reservoir 16a. On the other hand, when the pressure Pi at the inlet port 304 is lower than or equal to the relief pressure $P_{pO}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(p_P-Pi) \times A$. At this time, the pressure Pi introduced into the control chamber 334 via the inlet port 304 is canceled as an internal pressure. Therefore, the pressure balance at the poppet valve 314 can be illustrated by.

$$F_O + kx = P_p \times A$$

where
k is a spring coefficient of the set spring 342; and
x is a stroke of the poppet valve 314.

From the balancing equations give hereabove, the operational check valve 300 becomes open when the pilot pressure $P_p$ is higher than the relief pressure $P_{pO}$ and is held at its shut-off position while the pilot pressure is held lower than the relief pressure.

In the hydraulic circuit set forth above, the fluid pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via a pilot line 208. As set forth, the operational one-way check valve 300 is placed at an open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_O$. Then, the pressure relief valve 209 becomes active to open for allowing the excessive pressure of the working fluid to be relieved by a flow through the by-pass line 210.

When the engine stops, the pressure unit 16 ceases operation. By stopping of the pressure unit 16, the working fluid pressure in the supply line 35 drops. According to drop of the pressure in the supply line 35, the pilot pressure to be exerted to the operational one-way check valve 300 via the pilot line 300a drops. When the pressure in the pilot line 300a drops below or equals to the set pressure, the operational one-way check valve 300 is switched into operational one-way check position to block fluid communication therethrough. As a result, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it does not affect the fluid pressure in the working chamber.

Figure 4:
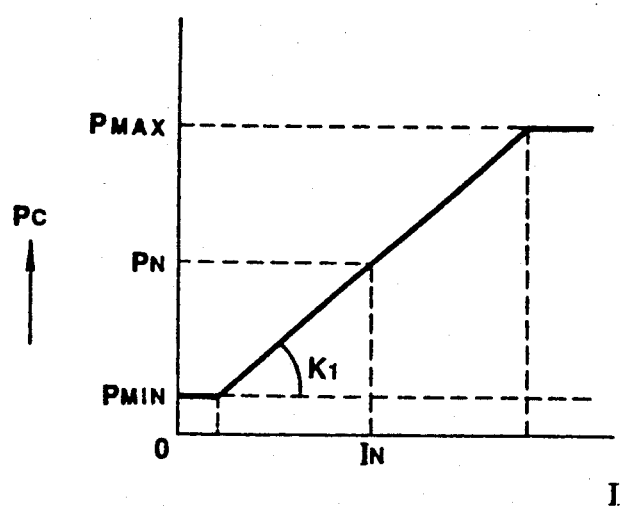
FIG. 4 is a chart showing the relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level labeled as $P_N$ represents neutral pressure at the neutral current $I_N$. As seen, the neutral current $I_N$ is set at an intermediate value between the maximum and minimum current values $I_{max}$ and $I_{min}$.

Operation of the aforementioned pressure control valve 28 in terms of control of suspension characteristics and absorption of road shock will be discussed hereinbelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, the path area of which is restricted by the valve head 48a of the poppet valve 48, becomes the neutral value. At this position of the poppet valve 48, the pilot pressure $P_P$ within the pilot chamber PR is maintained at the neutral pressure $P_N$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock is input through the vehicular wheel, the related energy is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in the rebounding direction, compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is relieved through the drain line 37. This causes a pressure drop at the pressure control port 54c, so that the control pressure Pc becomes lower than the pilot pressure $P_p$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42U1 of the control chamber 42U and via the multi-stage orifice Pr. As long as the fluid flow in the pilot return path PT is not disturbed and thus steady. The most upstream side orifice Pr' is mainly effective for restricting the fluid flow. Therefore, the magnitude of flow restriction is relatively small so as to provide sufficient response characteristics in reduction of the pilot pressure. On the other hand, when the working fluid flowing from the control chamber is in confluence with the working fluid from the pilot chamber a, back pressure is produced in the drain port and, the fluid flowing through the pilot return path PT is disturbed and thus becomes unstable. This tends to cause serving of the pressurized fluid from the drain port 54r to the pilot chamber PR. In such a case, all of the orifices in the multi-stage orifice Pr is become effective to create a greater flow restriction that than for the steady flow. This avoids the influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is actuated response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress the lowering motion of the vehicle body. On the other hand, the fluid pressure in the working chamber 26d of the hydraulic cylinder 26, which is provided for the suspension mechanism at the side where the vehicular height is risen across the neutral position, is decreased to suppress rising motion of the vehicle body. Therefore, in order to control the pressures in the working chamber 26d of the both side hydraulic cylinders 26, control signal current values are increased and creased across the neutral value $I_N$.

For example, when a rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fliud pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures $P_p$ in the pilot chamber PR. As set forth, since the fluid pressures in the working chambers 26d become equal to the pilot pressures $P_p$, the suspension characteristics at respective hydraulic cylinders 26 can be adjusted.

Anti-pitching, bouncing suppressive suspension control can be performed substantially in the same manner to that discussed with respect to the anti-rolling control.

The fluid supply controller 400 is connected to a pump speed sensor 402, a front-left stroke sensor 404 and a front-right stroke sensor 406. The pump speed sensor 402 generally monitors the rotation speed of the engine output shaft 200a as a pump revolution speed representative parameter for producing a pump speed indicative signal N. For monitoring the rotation speed of the engine output shaft 200a, any of appropriate sensors, such as magnetic, optical pick-up type sensors, and the like, can be used. The front-left and front-right stroke sensors 404 and 406 are respectively disposed in the front-left and the front-right suspension systems for monitoring relative strokes between the vehicular body and the suspension member for producing front-left and front-right stroke indicative signals $X_L$ and $X_R$. The fluid supply controller 400 processes the pump speed indicative signal N and the front-left and front-right stroke indicative signals $X_L$ and $X_R$ for deriving the flow control signal CS in order to control the valve position.

Figure 7:
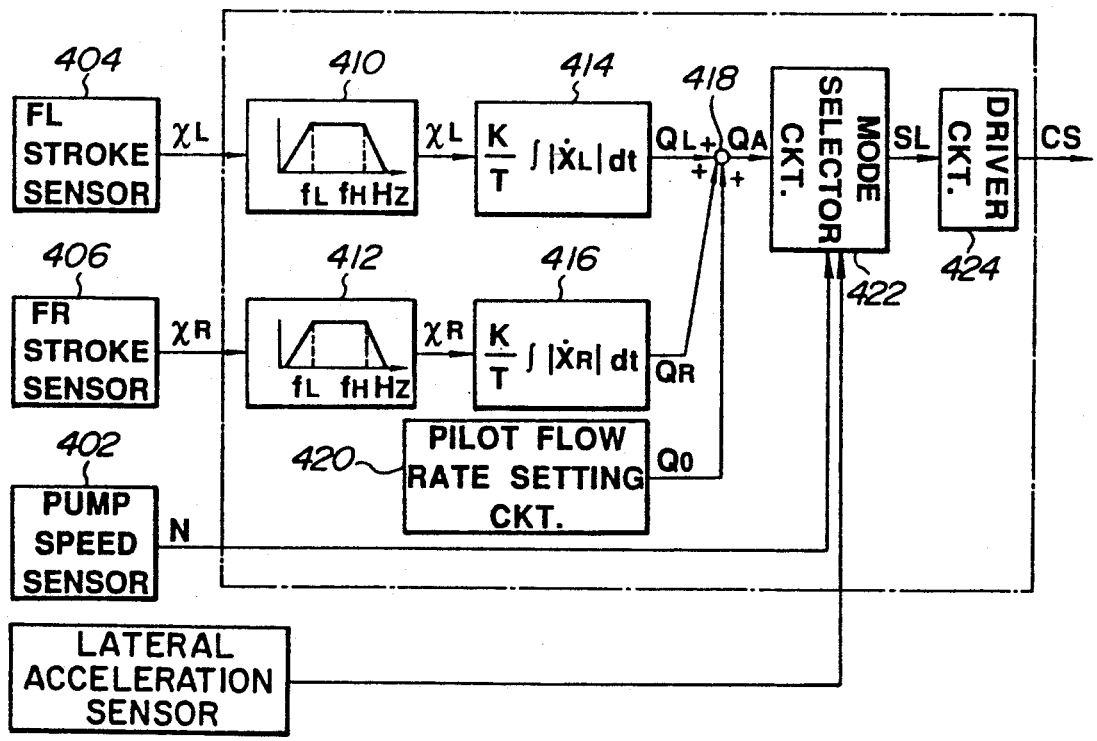
FIG. 7 is a block diagram of a discharge rate control circuit employed for controlling a discharge rate of the pressure unit in the first embodiment of the hydraulic circuit of FIG. 3.

As shown in FIG. 7, the fluid supply controller 400 comprises a band-pass filters 410 and 412 respectively receiving the front-left and front-right stroke indicative signals $X_L$ and $X_R$ for filtering out the stroke signal in a frequency range out of a predetermined frequency range which is defined by upper and lower cut-off frequencies $f_U$ and $f_L$. The lower cut-off frequency $f_L$ is set at a frequency corresponding to the frequency of vibration caused during vehicular height adjustment. For example, in the shown embodiment, the lower cut-off frequency $f_L$ is set at 0.5 Hz. On the other hand, the upper cut-off frequency $f_L$ is set at a frequency, e.g., 6 Hz, for removing frequency component corresponding to resonant frequency range of the sprung mass constituted of the suspension member, road wheel and so forth the like. Respective band-pass filters 410 and 412 output filtered signal $X_L'$ and $X_R'$ and supply to integrator circuits 414 and 416. Each of the integrator circuits 414 and 416 derives an integrated stroke value $Q_L$ and $Q_R$ on the basis of the filtered signal values $X_L'$ and $X_R'$ utilizing the following equation:

$$Q = \frac{K}{T} \int |X| dt$$

where
$Q$: $Q_L$, $Q_R$;
$X$: $X_L'$, $X_R'$;
$T$: integration period which is set in terms of the steering frequency, switching characteristics of the fluid pumps and so forth; and
$K$: gain determined corresponding to effective area of the hydraulic cylinder 26

The integrated stroke values $Q_L$ and $Q_R$ derived by the integrator circuits 414 and 416 are fed to an adder circuit 418. The adder circuit 418 is also connected to a pilot flow rate setting circuit 420 which generates a pilot flow rate indicative value $Q_0$ representative of total leak fluid amount in the pressure control valves 28. The adder circuit 418 adds the integrated stroke values $Q_L$ and $Q_R$ and the pilot flow rate indicative value $Q_0$ for deriving a predicted fluid flow rate indicative value $Q_A$.

Figure 8:
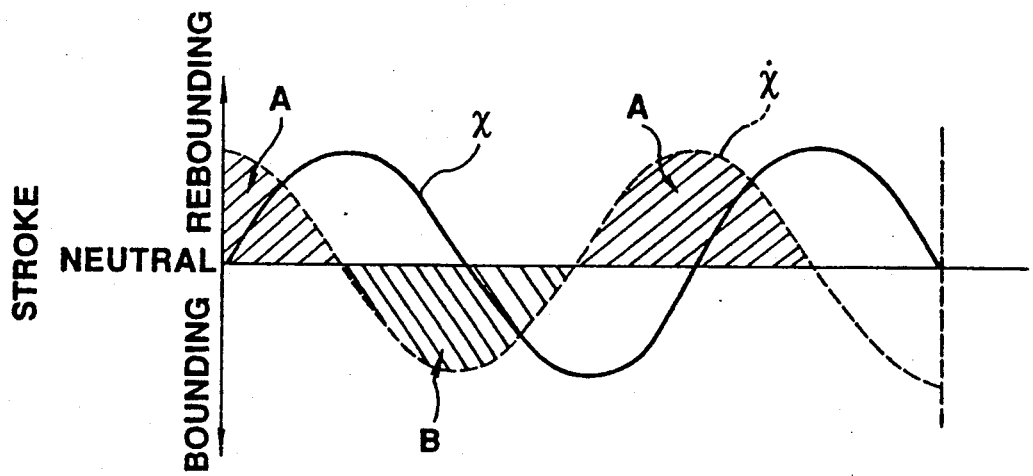
FIG. 8 is a chart showing the variation of stroke and an integrated value thereof as integrated by an integrator employed in the discharge rate control circuit of FIG. 7.

Here, in the practical vehicular bounding and rebounding activity, bounding motion and rebounding motion generally appears alternatively as illustrated by line $\dot{\chi}$ in FIG. 8. For the illustrated variation, the integrated value Q varies with a given phase shift as shown by the line $\dot{\chi}$ and represents the hatched areas A and B. As can be seen, an increased amount of fluid becomes necessary in the rebounding stroke in the area A. Therefore, as long as the front suspension system as illustrated in FIG. 8 is concerned, an increased amount of fluid is not required in the bounding stroke as represented by the area B.

The fluid supply controller 400 further includes a mode selector circuit 422 which receives the pump speed indicative signal N from the pump speed sensor 402 and the predicted fluid flow rate indicative value $Q_A$. The mode selector circuit 422 thus derives a mode selection signal SL representative selected one of the fluid supply mode according to the mode map as illustrated in FIG. 6. Mode selection signal SL is fed to a driver circuit 424 which output the flow control signal CS.

Figure 9:
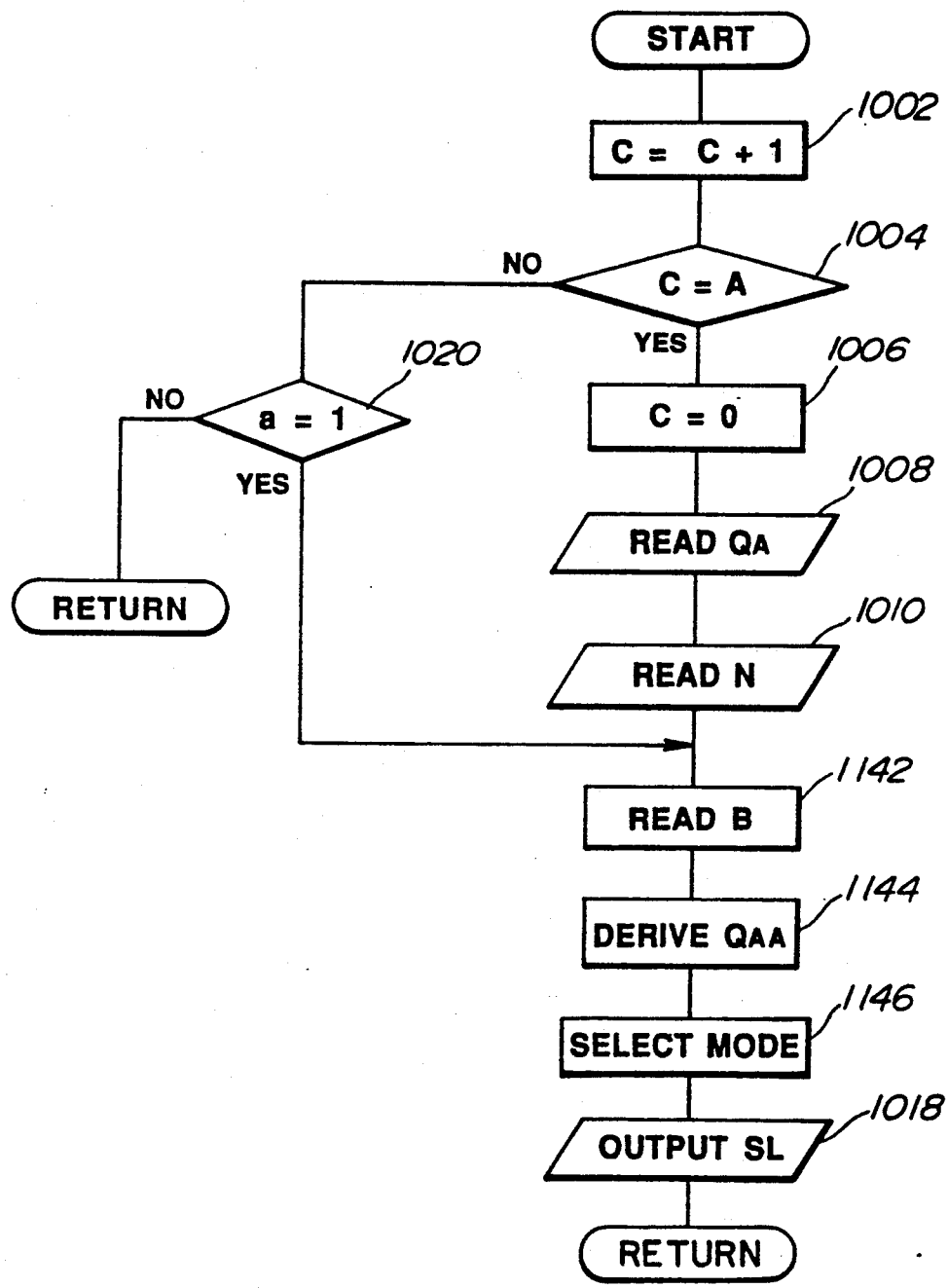
FIGS. 9 and 10 are flowcharts showing the process in a routine for setting the operational mode of the pressure unit.

Based on these input data, the mode selector circuit 422 performs a mode setting operation according to the process illustrated in FIG. 9. The routine of FIG. 9 is executed at every given internal. In the shown embodiment, the interval of mode setting operation is set at a length corresponding to the integration period T so that the shown routine can be executed in synchronism with integrating operation in the integrator circuits 414 and 416. On the other hand, the shown routine is executed every given interval, e.g., 20 ms. Immediately after starting execution in each execution cycle, a counter value c is incremented by one (1) at a step 1002. Then, at a step 1004, the counter value c as incremented at the step 1002 is compared with a predetermined value A corresponding to the interval of operation for setting mode. When the counter value c as checked at the step 1004 is smaller than the predetermined value A, process directly goes to END and returns to a main or background routine. On the other hand, if the counter value c as checked at the step 1004 is equal to the predetermined value A, then, the counter value c is cleared at a step 1006. Subsequently, the predicted flow rate indicative value $Q_A$ is read out at a step 1008, and the pump speed indicative signal value N is read out at a step 1010. Then, at a step 1012, a correction value B which is derived through the process of FIG. 19 and will be discussed later, is read out. Then, the predicted flow rate indicative value $Q_A$ is modified with the correction value B to derive a modified predicted value $Q_{AA}$, at a step 1014. Then, the fluid flow rate mode is selected on the basis of the predicted flow rate indicative value $Q_{AA}$ and the pump speed indicative signal value N at a step 1016. Subsequently, the mode selection signal SL is output to the driver circuit 424, at a step 1018.

On the other hand, if the counter value C as checked at the step 1004 is not equal to A, the stroke magnitude dependent flow control state indicative flag a is checked whether the flag a is set or not, at a step 1020. When the stroke magnitude dependent flow control state indicative flag a is set as checked at the step 1020, the process goes to the step 1012. Otherwise the process goes to END.

Figure 10:
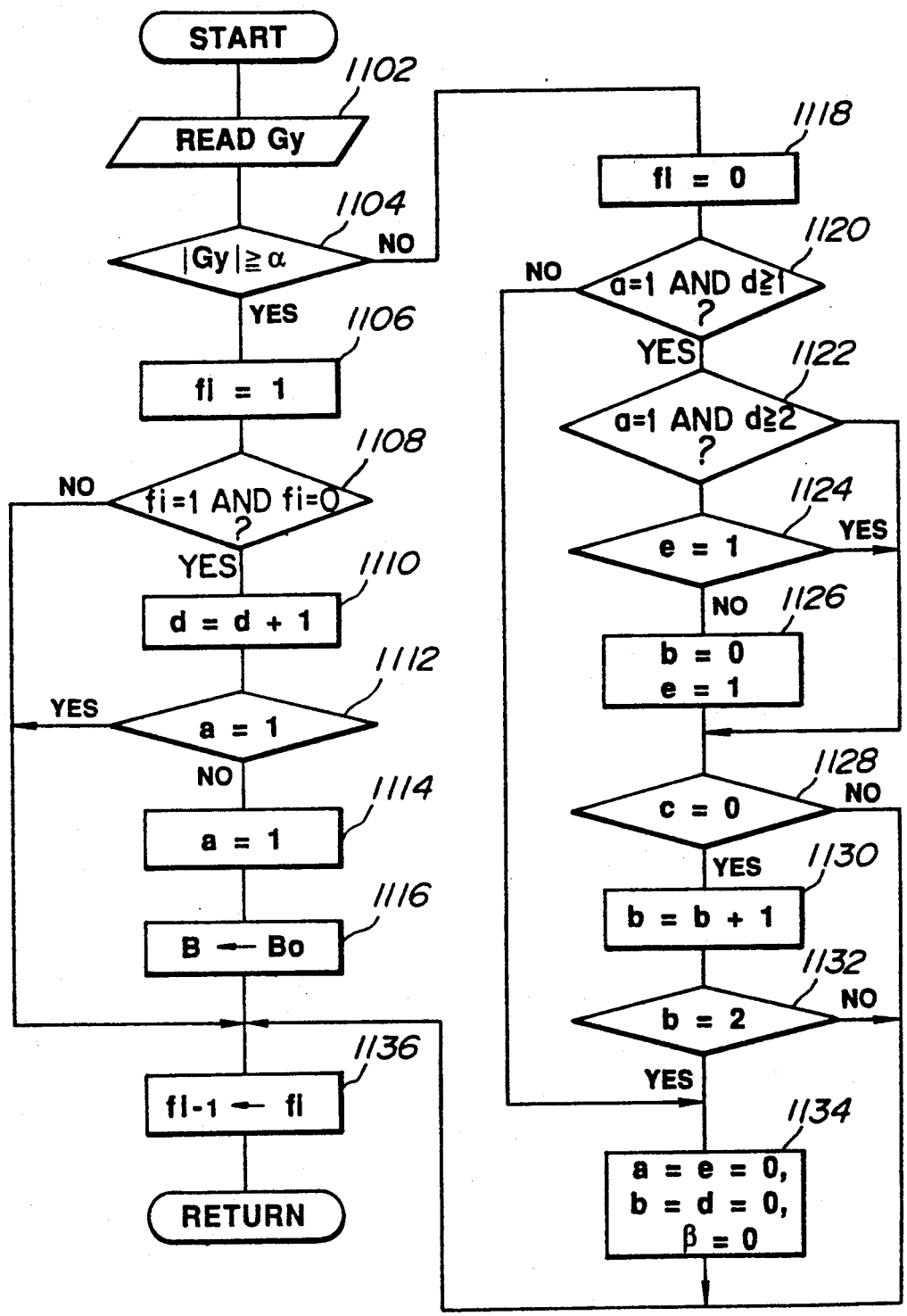

FIG. 10 shows a process for detecting a vertical stroke requiring greater fluid flow rate for providing sufficient response characteristics in active suspension control. Immediately after starting execution, the lateral acceleration indicative signal Gy is read out, at a step 1102. Then, the lateral acceleration indicative signal Gy is compared with an acceleration threshold $\alpha$ at a step 1104. When the magnitude of the lateral acceleration exerted on the vehicle body greater than the acceleration threshold is detected the step 1104 a stroke indicative parameter value $f_i$ is set at one (1) at a step 1106. Then, at a step 1108, the stroke indicative parameter value $f_i$ set at the step 1106 in the current execution cycle and $f_{i-1}$ set in the immediately preceding execution cycle are checked. When the stroke indicative parameter value $f_i$ is set at one (1) which value represents large stroke magnitude, and the stroke indicative parameter value $f_{i-1}$ is set at zero (0) which value represents small stroke magnitude, a counter value d is incremented by one (1) at a step 1110. Then, the stroke magnitude dependent flow control state indicative flag a is checked at a step 1112. If the stroke magnitude dependent flow control state indicative flag a is not set as checked at the step 1112, the flat is set at a step 1114. Then, a predicted fluid flow amount correction value B is set at a predetermined fixed value $B_0$.

As can be seen from FIG. 6 the fixed value $B_0$ is set at a value smaller than the variation range of the fluid flow rate so that when correction of the predicted flow rate is made at point $m_1$, selection of a higher level flow rate cannot be made.

On the other hand, when both answers at the step 1104 are negative, the stroke indicative parameter value $f_i$ is set at zero (0) at a step 1118. Thereafter, the stroke magnitude dependent flow control state indicative flag a and the counter valuer d are checked at a step 1120. When the stroke magnitude dependent flow control state indicative flag a is set at one (1) and the counter value d is equal to one (1), as checked at the step 1120, a further check is performed for the stroke magnitude dependent flow control state indicative flag a and the counter value d at a step 1122. When the stroke magnitude dependent flow control state indicative flag a is set at one (1) and the counter value d is equal to two (2), as checked at the step 1122, a flag e is checked at a step 1124, which flag represents the states that the vertical stroke is maintained in large stroke magnitude or an elapsed time after termination of the large stroke magnitude is shorter than a predetermined period, is checked, at a step 1124. When the flag e as checked at the step 1124 is not set as checked, a counter value b is cleared and the flag e is set, at a step 1126.

At a step 1128, the counter value c is checked whether the counter value is zero. If the counter value c as checked at the step 1128 is zero, then, the counter value b is incremented by one (1) at a step 1130. Subsequently, the counter value b is checked at a step 1132 whether the incremented counter value b is equal to two (2). If the counter value b as checked at the step 1132 is equal to two, then, the flags a and e are reset and the counter values b and c are cleared at a step 1134.

After the process at either the step 1118 or 1134, the stroke indicative parameter data $f_{i-1}$ as the previously derived parameter data is updated by the current value of $f_i$ at a step 1136.

On the other hand, if the answer at the step 1120 is negative, the process jumps directly to the step 1134. Similarly, if the answers at the step 1122 are negative or the answer at the 1126 is positive, the process jumps to the step 1128. If the counter value c is not zero as checked at the step 1128 or if counter value b is not two (2) as checked at the step 1132, process jumps to the step 1136.

In the practical operation of the fluid supply controller 400, when the ignition switch is held ON position to maintain the engine running in an idling state, the front-left and front-right suspension systems are maintained in a static state. Therefore, the front-left and front-right stroke indicative signals $X_L$ and $X_R$ of the front-left and front-right stroke sensors 404 and 406 are maintained substantially at a constant value. Therefore, the frequency of these front-left and front-right stroke indicative signals $X_L$ and $X_R$ are maintained lower than the lower cut-off frequency. As a result, the output levels of the band-pass filters 410 and 412 are held substantially zero (0). Therefore, the predicted fluid flow rate indicative value $Q_A$ derived by the adder circuit 418 becomes essentially or approximately equal to the pilot flow rate indicative value $Q_0$. Then, the point on the mode selection map of FIG. 6 corresponds to the point $m_0$. Therefore, the smaller flow rate mode is selected.

In the practical implementation, when the smaller flow rate mode is selected, the flow control signal CS is maintained low level to maintain the solenoid 206d deenergized. At this position, the fluid communication between the first inlet port 206a and the outlet port 206c is established so that the fluid discharged from the second pump $16_{Qb}$ is supplied through the supply line 35.

On the other hand, when the vehicle travels on a well surfaced smooth road, the road shock vibration with vibration frequency higher than the upper cut-off frequency is removed from the front-left and front-right stroke indicative signals $X_L$ and $X_R$ by the band-pass filters 410 and 412. Therefore, similar to that in the engine idling state, the front-left and front-right stroke indicative signals $X_L$ and $X_R$ of the front-left and front-right stroke sensors 404 and 406 are maintained substantially at constant value. Therefore, the frequency of these front-left and front-right stroke indicative signals $X_L$ and $X_R$ are maintained lower than the lower cut-off frequency. As a result, the output level of the band-pass filters 410 and 412 are held substantially zero (0). Therefore, the predicted fluid flow rate indicative value $Q_A$ derived by the adder circuit 418 becomes essentially or approximately equal to the pilot flow rate indicative value $Q_0$. Then, the point on the mode selection map of FIG. 6 corresponds to the point $m_0$. Therefore, the smaller flow rate mode is selected.

When the vehicle travels on a rough or undulating road, the relative displacement between the vehicle body and the suspension member becomes substantial. As a result, the front-left and front-right stroke indicative signals $X_L$ and $X_R$ falling within the predetermined frequency range are increased to increase the predicted fluid flow rate indicative value $Q_A$. Assuming that the point identified by the predicted fluid flow rate indicative value $Q_A$ and the pump speed indicative signal value N corresponds to the point $m_2$ on FIG. 6, the greater flow rate mode is selected. Therefore, the mode selection signal SL commanding the greater flow rate mode is fed to the driver circuit 424. The driver circuit 424 thus output the high level flow control signal CS to energize the solenoid 206d. Therefore, the flow control valve 206 establishes fluid communication between the second inlet port 206b and the outlet port 206c so as to establish direct connection between the second pump $16_{Qb}$ and the fluid reservoir 16a. At this position, the greater amount of fluid discharged from the first fluid pump $16_{Qa}$ is supplied to the pressure control valve.

Figure 11:
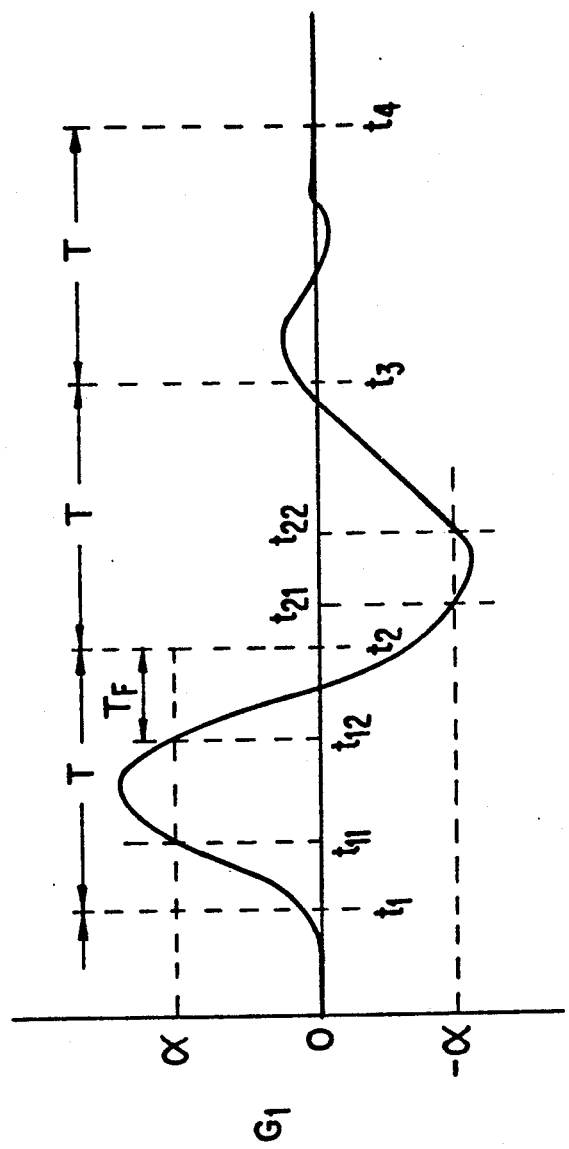
FIG. 11 is a timing chart showing illustrating an operation of the first embodiment of the hydraulic circuit.

When the undulation on the road surface is not rough enough to cause a vertical acceleration greater than the acceleration criterion, the stroke dependent pump control is still effective for controlling the fluid flow rate depending upon the magnitude of vertical stroke. The activity of the vertical stroke dependent discharge rate control may be understood from the following discussion given with reference to FIG. 11. In the chart of FIG. 11, it is assumed that the relatively large magnitude of vertical vibration is initiated at a time $t_1$ and increased across the stroke at a time $t_{11}$. Until the time $t_{11}$, since the lateral acceleration Gy is maintained at a value smaller than the stroke criterion. Therefore, the flag a is maintained at reset condition. At the time $t_{11}$, the flag a is set initially. Then, fluid flow mode is switched from smaller flow rate mode a to greater flow rate mode. At a time $t_{12}$, the lateral acceleration becomes smaller than the stroke criterion. Subsequently, the vertical stroke in the opposite direction becomes in excess of the stroke criterion at a time $t_{13}$. As long as the interval between the times $t_{12}$ and $t_{13}$ is shorter than the predetermined period $T_F$, the greater flow rate mode is maintained.

Figure 12:
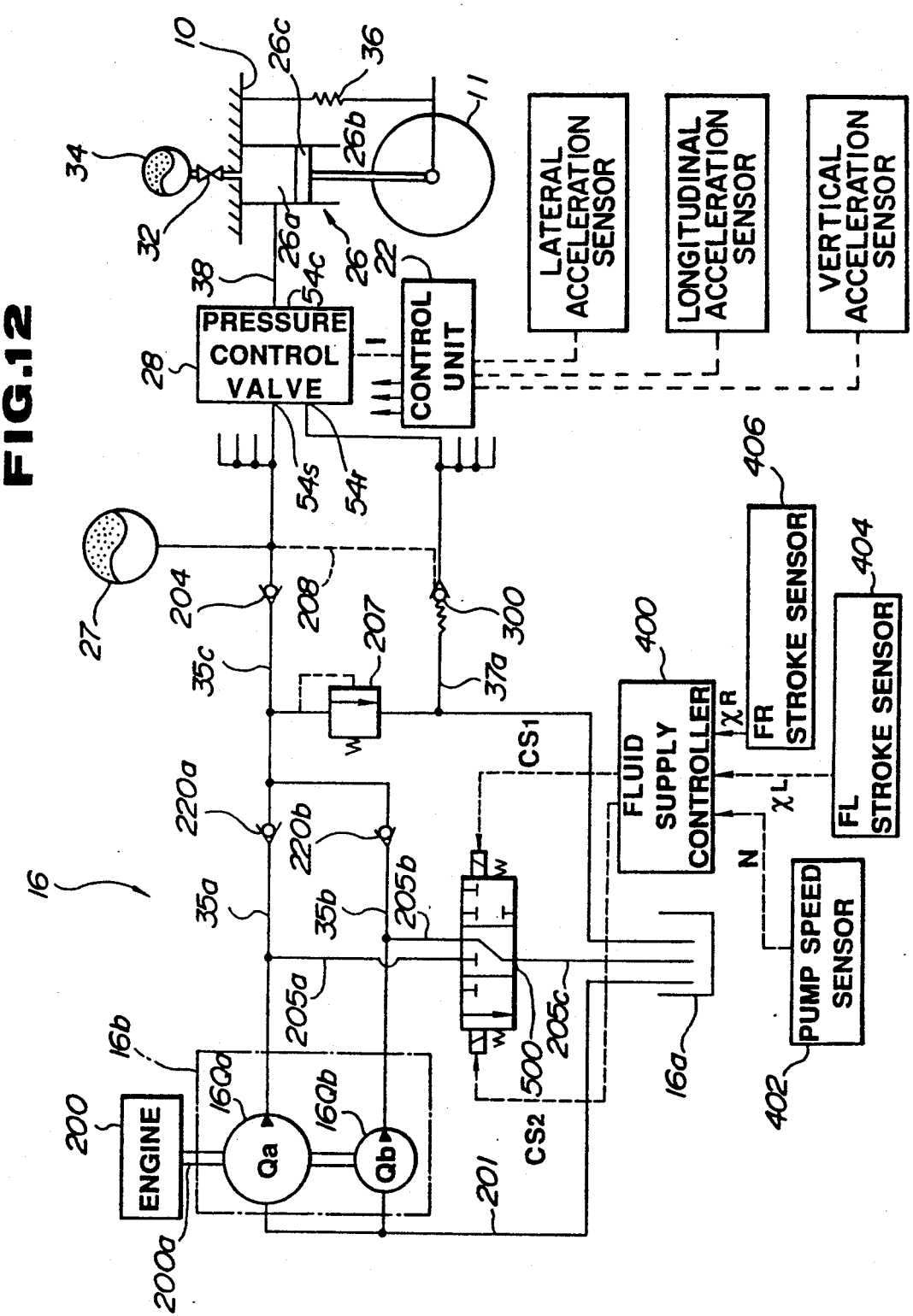
FIG. 12 is a circuit diagram of the second embodiment of the hydraulic circuit in the active suspension system.

FIG. 12 is a diagram of another embodiment of a hydraulic circuit to be employed in the preferred embodiment of an active suspension system according to the present invention. The shown embodiment is differentiated only in the construction of the electromagnetic flow control valve 500. The shown flow control valve 500 is operable in three different modes. Namely, the flow control valve 500 is operable to an additional mode position in addition to the mode positions of the flow control valve 206 in as taught the former embodiment and, in which additional mode position, both of the branched supply lines 35a and 35b are blocked from fluid communication with drain line 37 via the flow control valve. Therefore, in the embodiment per FIG. 12, the operational mode in which the fluid communication between the branched supply line 35a and the drain line 37 via the flow control valve 500 will be referred to as "minimum flow rate mode", in which both of the fluid communication between the branched supply line 35a and the drain line 37 and between the branched supply line 35b and the drain line 37 via the flow control valve 500, will be referred to as "maximum flow rate mode", and in which the fluid communication between the branched supply line 35b and the drain line 37 via the flow control valve is established and will be referred to as "medium flow rate position".

In order to establish the aforementioned three mode positions, the flow control valve 500 is associated with a pair of electromagnetic solenoids 502 and 504. For the solenoid 502, a first flow control signal $CS_1$ is supplied. On the other hand, for the solenoid 504, a second flow control signal $CS_2$ is supplied. When the first control signal $CS_1$ is HIGH level and the second control signal $CS_2$ is LOW level, the maximum flow rate mode is established. ON the other hand, when the both of the first and second flow control signals $CS_1$ and $CS_2$ are held at the LOW level, the medium flow rate mode position is established. Similarly, when the first control signal $CS_1$ is LOW level and the second control signal $CS_2$ is HIGH level, the minimum flow rate mode position is established.

Figure 13:
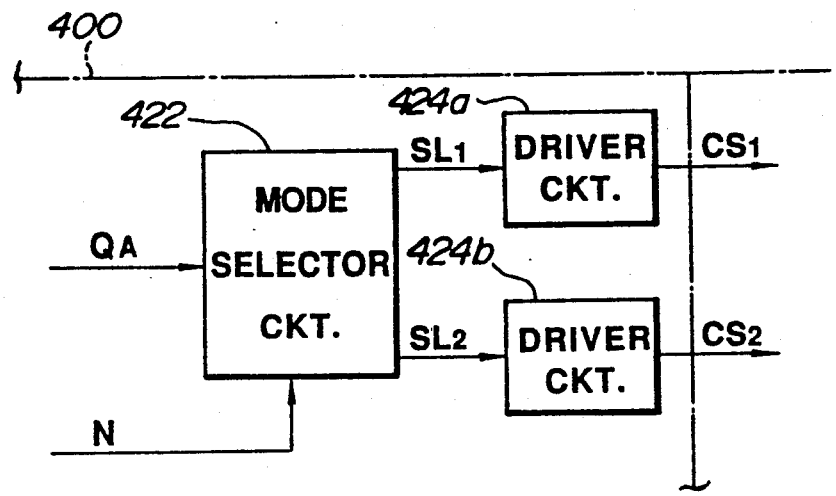
FIG. 13 is a block diagram of the discharge rate control circuit to be employed for controlling a discharge rate of the pressure unit in the second embodiment of the hydraulic circuit of FIG. 12.
Figure 14:
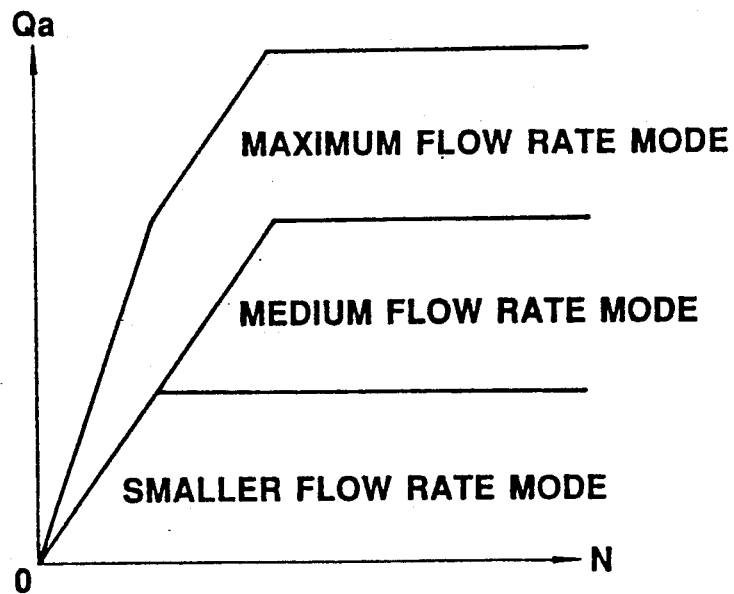
FIG. 14 is a chart showing a variation of fluid discharge rate of a pressure unit employed in the second embodiment of the hydraulic circuit of FIG. 10.

For providing the first and second flow control signals $CS_1$ and $CS_2$, the mode selector circuit 422 in the fluid supply controller 400 is modified from that in the former embodiment. As can be seen, the mode selector circuit 422 is connected to first and second driver circuits 424a and 424b, as shown in FIG. 13. The mode selector circuit 422 selects one of the aforementioned three modes on the basis of the pump speed N and the predicted fluid flow rate indicative value $Q_A$ according to the characteristics of FIG. 14. The mode selector circuit 422 outputs first and second mode selection signals $SL_1$ and $SL_2$ combination thereof representative of the selected mode. The mode selector signal $SL_1$ is fed to the first driver circuit 424a so that the flow control signal $CS_1$ output therefrom can be switched between the HIGH and LOW level according to the signal level of the mode selection signal $SL_1$. Similarly, the mode selector signal $SL_2$ is fed to the second driver circuit 424b so that the flow control signal $CS_2$ therefrom can be switched between HIGH and LOW level according to the signal level of the second mode selection signal.

Figure 15:
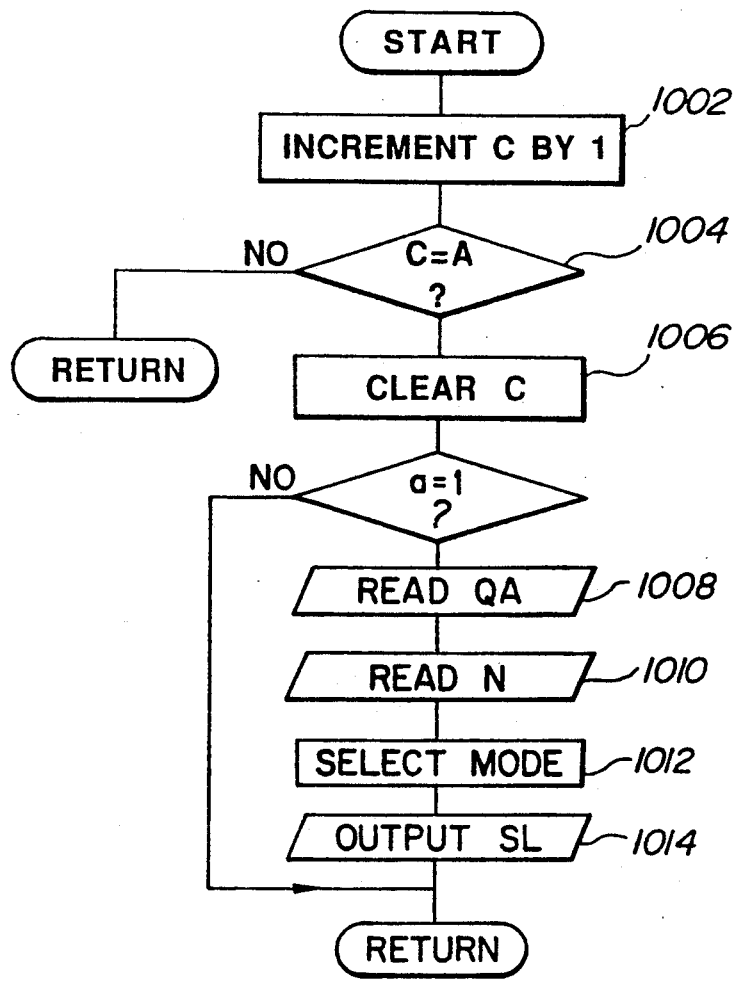
FIGS. 15 and 16 are flowcharts showing the process of fluid flow rate control to be performed by the hydraulic circuit of FIG. 12.

Based on these input data, the mode selector circuit 422 performs mode setting operation according to the process illustrated in FIG. 15. The routine of FIG. 15 is executed at every given internal. In the shown embodiment, the interval of mode setting operation is set at a length corresponding to the integration period T so that the shown routine can be executed in synchronism with integrating operation in the integrator circuits 414 and 416. On the other hand, the shown routine is executed every given interval, e.g., 20 ms. In the shown embodiment of FIG. 15, fluid flow adjustment is performed in advance of discharge mode selection in contrast to the former embodiments. Immediately after starting execution in each execution cycle, a counter value c is incremented by one (1) at a step 1002. Then, at a step 1004, the counter value c as incremented at the step 1002 is compared with a predetermined value A corresponding to the interval of operation for setting mode. When the counter value c as checked at the step 1004 is smaller than the predetermined value A, process directly goes the process goes directly to END and returns to a main or background routine. On the other hand, if the counter value c as checked at the step 1004 is equal to the predetermined value A, the counter value c is cleared at a step 1006. Subsequently, the flow rate control state indicative flag a is checked at a step 1007. If the flag is set, which indicates that flow rate adjustment is already made, the process goes directly to END. Otherwise, the predicted flow rate indicative value $Q_A$ is read out at a step 1008, and the pump speed indicative signal value N is read out at a step 1010. Then, at a step 1030, the mode selection between the smaller flow rate mode and the greater flow rate mode according to the chart of FIG. 6. Subsequently, the mode selection signal SL is output to the driver circuit 424 at a step 1018.

Figure 16:
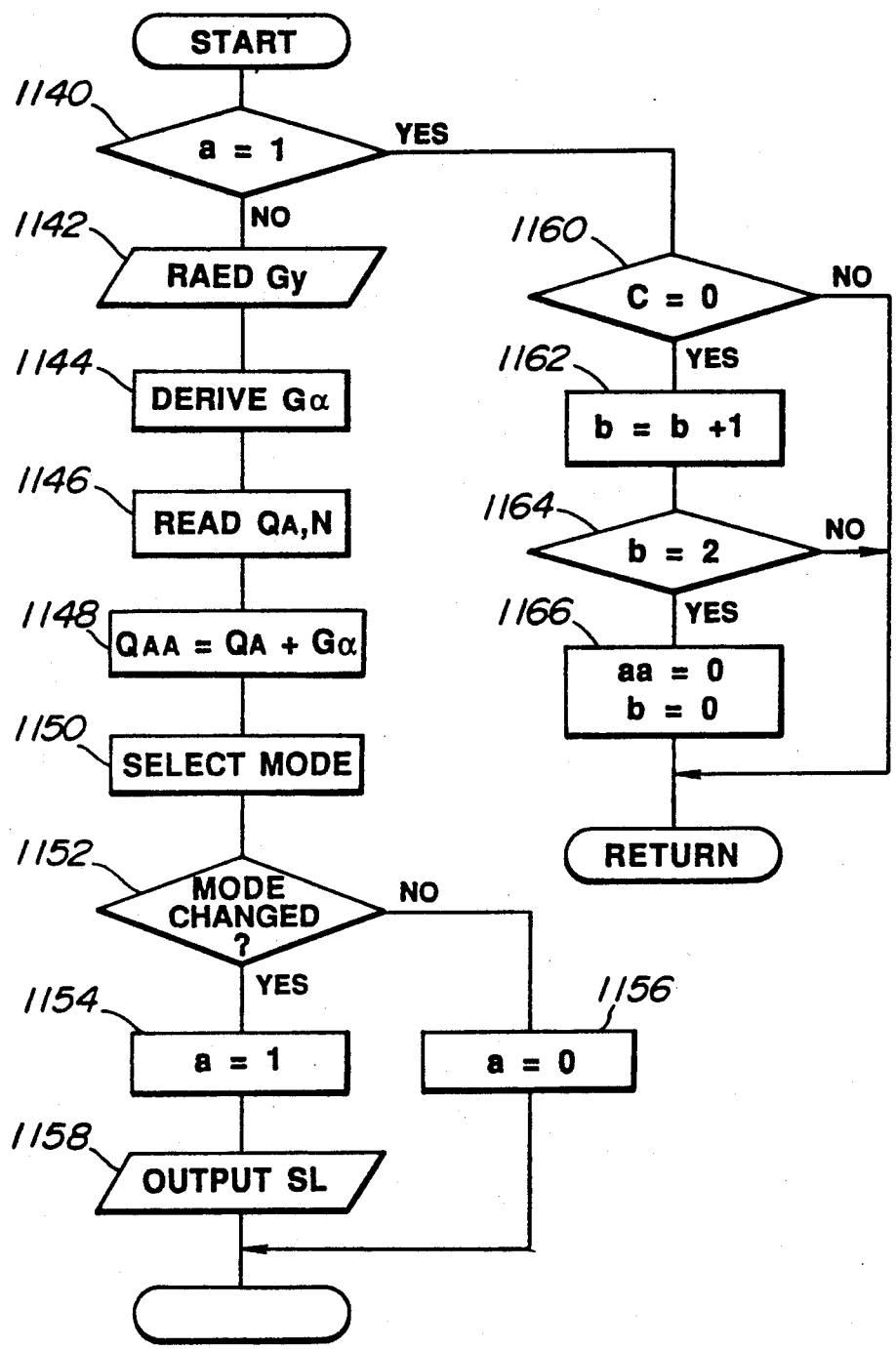
Figure 17:
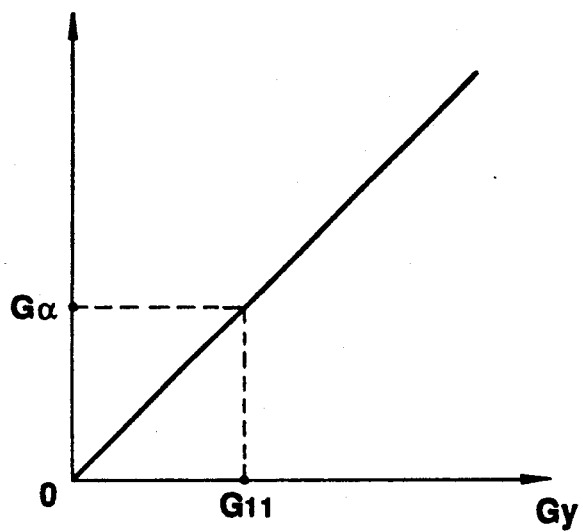
FIG. 17 is a chart showing variation of predicted flow amount indicative data $G\alpha$ in relation to lateral acceleration, as controlled by the process illustrated in FIGS. 15 and 16.
Figure 18:
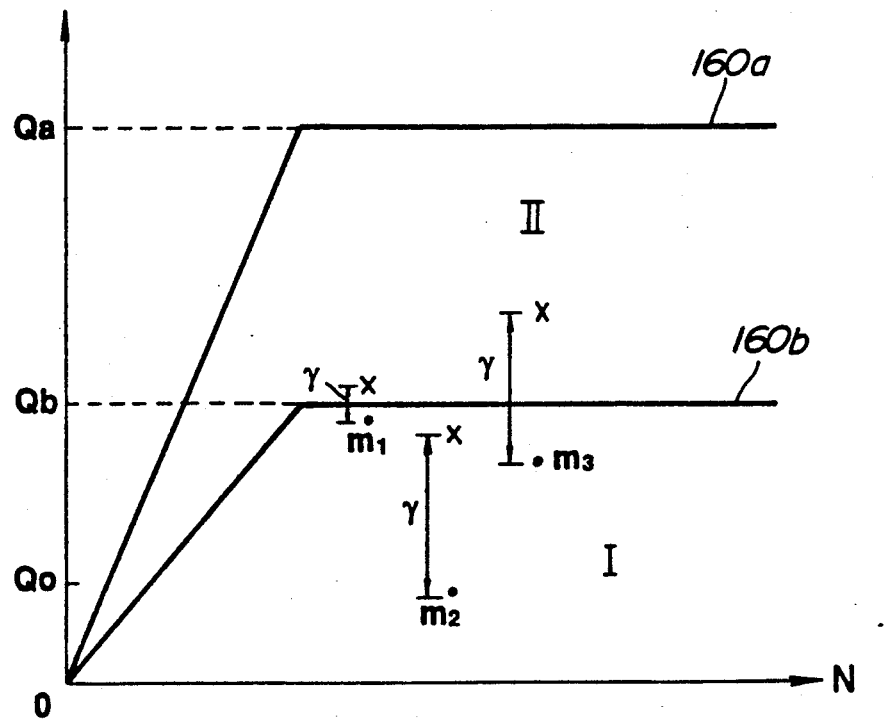
FIG. 18 is a chart showing discharge characteristics of a pump as controlled through the process of FIGS. 15 and 16.

FIG. 16 shows a process for detecting a vertical stroke requiring greater fluid flow rate for providing sufficient response characteristics in active suspension control. Immediately after starting execution, the flow rate control state indicative flag a is checked at a step 1140. If not, the lateral acceleration indicative signal Gy is read out, at a step 1122. Then, the lateral acceleration dependent value $G\alpha$ is derived on the basis the lateral acceleration Gy at a step 1144. The lateral acceleration indicative value $G\alpha$ varies as illustrated in FIG. 17. The predicted flow amount indicative value $Q_A$ and the pump speed N are read out at a step 1146. Based on the predicted flow amount indicative data, $Q_A$ is then modified with the lateral acceleration dependent value $G\alpha$ to derive a modified predicted flow amount value $Q_{AA}$, at a step 1148. Thereafter, based on the modified predicted flow amount indicative value $Q_{AA}$ and the pump speed N, the flow rate mode is selected at a step 1150. The selected mode is then compared with the previously selected mode at a step 1152. If so, the flow rate control state flag a is set at a step 1154 and otherwise reset at a step 1156. Subsequently, the flow rate control signal SL is output at a step 1158.

On the other hand, when the flow rate control state indicative flag is not set as checked at the step 1140, then the counter value c is checked whether it is equal to zero at a step 1160. If so, a counter value b is incremented by one at a step 1162. Then, the counter value b is checked whether the counter value b is two (2) at a step 1064. If it is, the flow rate control state indicative flag a is reset and the counter value b is cleared at a step 1166. On the other hand, when the answer at either the steps 1160 and 1166 is negative, the process goes directly END.

With the shown embodiment, the value $G\alpha$ to be used for correcting the predicted flow amount becomes variable depending upon the magnitude of the lateral acceleration Gy.

As will be appreciated, the present invention fulfills all of the objects and advantages sought therefor.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied wihtout departing from the principle of the invention set out in the appended claims.

What is claimed is:

1. A fluid supply system for an active suspension system of a vehicle for supplying a pressurized fluid for a hollow working cylinder via a pressure control valve for adjusting suspension characteristics in order to suppress vehicular attitude changes and to absorb road shock vibration, said system comprising:

a pressurized fluid source unit for circulating pressurized fluid through a fluid circuit extending via said pressure control valve and said working cylinder;

a first sensor means for monitoring relative displacement between the body of the vehicle and a suspension member rotatably supporting a road wheel of the vehicle for producing a relative displacement magnitude indicative signal, said pressurized fluid source unit being operable in various mutually different discharge modes at variable discharge rates of the working fluid;

a second sensor means for monitoring a lateral acceleration exerted on the vehicular body;

first means for deriving a predicted fluid flow amount through said fluid circuit on the basis of said relative displacement indicative signal to produce a predicted fluid flow amount indicative signal;

second means for detecting a magnitude of lateral acceleration greater than or equal to a predetermined acceleration criterion to produce an acceleration detection signal; and third means for deriving a required fluid supply amount from said pressurized fluid source unit on the basis of said predicted fluid flow amount for controlling said pressurized fluid source unit in order to adjust the supply amount of fluid toward the derived fluid supply amount, said third means being responsive to said acceleration detection signal for selecting one of said variable discharge rates which satisfies said required fluid supply amount with a minimum discharge rate.

2. A fluid supply system as set forth in claim 1, wherein:

said third means maintains the increased supply amount of a given period of time after termination of said acceleration indicative signal.

3. A fluid supply system as set forth in claim 2 wherein:

said fluid circuit includes a supply line for supplying the pressurized fluid to said pressure control valve and a drain line for recirculating the pressurized fluid to said pressurized fluid source unit, and said pressurized fluid source unit includes a by-pass line connecting between said supply line and said drain line by-passing said pressure control valve and a flow control valve means disposed within said by-pass line for adjusting pressurized fluid recirculation rate through said by-pass line for adjusting fluid supply amount to said pressure control valve to said derived fluid supply amount.

4. A fluid supply system as set forth in claim 3, wherein:

said pressurized fluid source unit comprises a first pump having a first discharge rate and a second pump having a second discharge rate smaller than said first discharge rate, said flow control valve means selectively connecting said first and second pump to said drain line via said by-pass line.

5. A fluid supply system as set forth in claim 4, wherein:

said first and second pumps are coupled with an engine of the vehicle to be driven by the output thereof.

6. A fluid supply system as set forth in claim 5, wherein:
said first and second pumps fluid have respective discharge rates depending upon a speed of said engine.

7. A fluid supply system as set forth in claim 6, further comprising:
a pump speed sensor for monitoring a pump speed to produce a pump speed indicative signal,
said third means deriving said fluid supply amount on the basis of said predicted fluid flow amount and said pump speed as represented by said pump speed indicative signal.

8. A fluid supply system as set forth in claim 2, wherein:
said first sensor means comprises a stroke sensor for monitoring a magnitude of a stroke of a bounding and rebounding activity of the vehicle to produce a corresponding stroke indicative signal.

9. A fluid supply system as set forth in claim 8, wherein:
said first mans extracts a predetermined frequency range of a signal component in said stroke indicative signal, for processing the extracted signal component for deriving said predicted fluid flow amount.

10. A fluid supply system as set forth in claim 9, wherein:
said first means includes a band-pass filter having a pass band corresponding to said predetermined frequency range.

11. A fluid supply system as set forth in claim 2, further comprising:
a pump speed sensor for monitoring a rotational speed of a pump incorporated in said pressurized fluid source unit to produce a pump speed indicative signal,
wherein said third means derives said fluid supply amount on the basis of said predicted fluid flow amount and said pump speed as represented by said pump speed indicative signal, and modifies the fluid supply amount for a given rate in response to said acceleration detection signal.

12. A fluid supply system as set forth in claim 11, wherein:
said third means selects a discharge characteristic of said pump on the basis of said predicted fluid flow amount and said pump speed and modifies the discharge characteristic in response to said acceleration detection signal.

* * * * *